United States Patent [19]
Won

[11] Patent Number: 5,448,309
[45] Date of Patent: Sep. 5, 1995

[54] NOISE CANCELER FOR VIDEO SIGNAL

[75] Inventor: Hwang D. Won, Seoul, Rep. of Korea

[73] Assignee: Samsung Electronics Co., Ltd., Kyunki-do, Rep. of Korea

[21] Appl. No.: 143,618

[22] Filed: Nov. 1, 1993

[30] Foreign Application Priority Data

Oct. 30, 1992 [KR] Rep. of Korea .............. 92-20206
Dec. 26, 1992 [KR] Rep. of Korea .............. 92-25635

[51] Int. Cl.$^6$ ........................................ H04N 5/213
[52] U.S. Cl. ................................. 348/607; 348/618
[58] Field of Search ............... 358/167, 36, 166, 96; 348/607, 609, 618, 622, 625, 628, 615; H04N 5/213

[56] References Cited

U.S. PATENT DOCUMENTS

| | | | |
|---|---|---|---|
| 4,839,727 | 6/1989 | Tanaka et al. | 358/167 |
| 4,969,033 | 11/1990 | Yamada et al. | 358/167 |
| 5,047,840 | 9/1991 | Miki | 358/36 |
| 5,166,794 | 11/1992 | Tanaka | 358/167 |

Primary Examiner—Victor R. Kostak
Attorney, Agent, or Firm—Sughrue, Mion, Zinn, Macpeak & Seas

[57] ABSTRACT

A noise canceler for a video signal includes: a delay circuit for outputting a succeeding line video signal, a present line video signal and a preceding line video signal: a minimum value detector which compares the succeeding line video signal with the present line video signal, and the present line video signal with the preceding line video signal, so as to output the lower-level minimum value; a maximum value selector for comparing the minimum values so as to select the higher-level maximum value; a maximum value detector which compares the succeeding line video signal with the present line video signal, and the present line video signal with the preceding line video signal, so as to output the higher-level maximum value; a minimum value selector for comparing the maximum values so as to select the lower-level minimum value; an adder for summing the maximum value output from the maximum value selector and the minimum value output from the minimum value selector so as to output a signal containing correlation noise; and a subtracter for subtracting the present line video signal from the summed signal from the adder so as to output a video signal without noise.

3 Claims, 8 Drawing Sheets

NOISE CANCELER FOR VIDEO SIGNAL

BACKGROUND OF THE INVENTION

The present invention relates to a noise canceler for a video signal, and more particularly to a noise canceler which cancels the noise of a video signal using a correlation between horizontal lines.

Generally, video signal processing systems, e.g., televisions, VTRs, etc. include circuits for canceling the noise contained in a video signal, as means for acquiring good picture quality.

Figure 1:
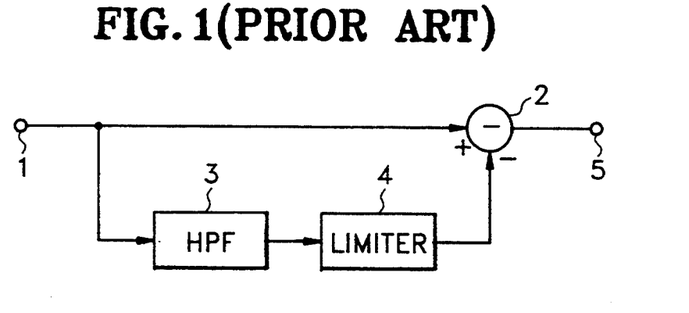
FIG. 1 is a block diagram of a conventional noise canceler for a video signal.

FIG. 1 is a block diagram of a conventional noise canceler for a video signal. The conventional noise canceler comprises a high-pass filter (HPF) 3 for high-pass-filtering a video signal input via an input port 1, a limiter 4 for extracting and outputting the noise components below a threshold from the output of HPF 3, and a subtracter 2, for subtracting the output of limiter 4 from the video signal and outputting the result via an output port 5.

FIGS. 2A–2D are operation waveforms of the conventional noise canceler shown in FIG. 1, with N indicating noise and TH representing the threshold of the limiter.

Figure 2A:
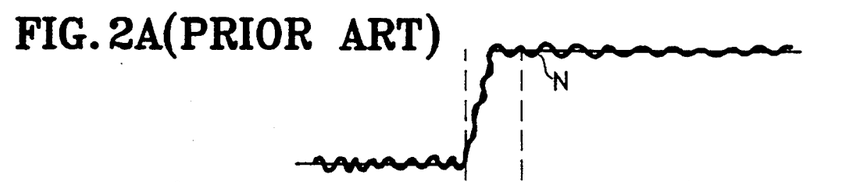
FIGS. 2A-2D are operation waveforms illustrating signal waveforms at respective portions of the noise canceler of FIG. 1.
Figure 2B:
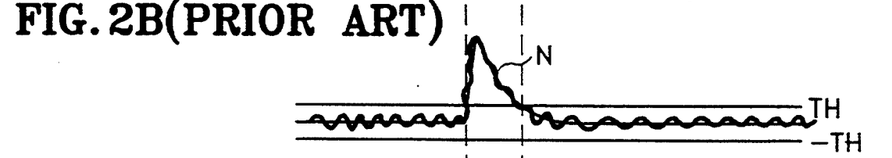
Figure 2C:
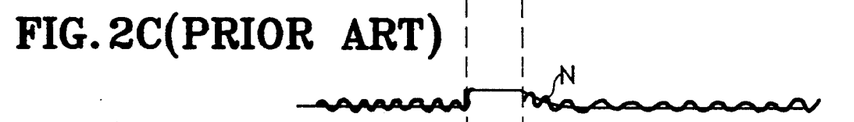
Figure 2D:
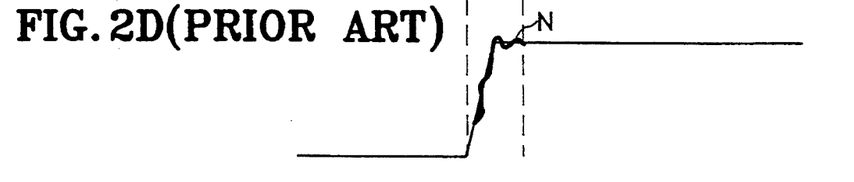

FIG. 2A shows a video signal input via input port 1 and containing noise. FIG. 2B shows the video signal having passed through HPF 3, whereby a pulse is formed in correspondence with the sharply rising leading edge thereof. FIG. 2C shows noise components in which the signal of FIG. 2B is limited to a predetermined threshold level. FIG. 2D shows the output in which the noise components of FIG. 2C is subtracted from the video signal of FIG. 2A. In FIG. 2D, however, it is noted that the noise components are not canceled in the portions in which the signal is sharply changed.

Referring to FIGS. 1 and 2A–2D, the video signal of FIG. 2A is input to subtracter 2 and HPF 3 via input port 1. Limiter 4 is connected in series to HPF 3 and extracts and outputs to subtracter 2 the noise components contained in the video signal. Subtracter 2 cancels the output of limiter 4, that is, the noise components of FIG. 2C, from the input video signal, and then outputs the video signal without noise to the output port 5. The noise canceler of FIG. 1 can cancel most of the noise components. i.e., low-level components, but is unable to cancel those above the threshold level. As shown in FIG. 2C, since, at the transitional edges of a signal, the noise occurs at a level higher than the threshold, the noise is blocked by limiter 4 and thus cannot be canceled.

Figure 3:
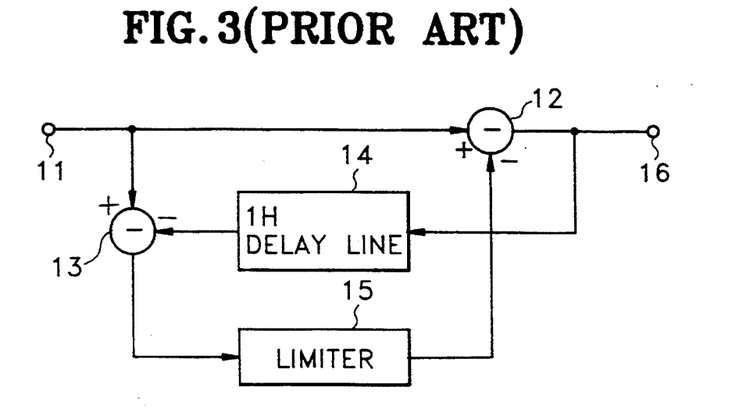
FIG. 3 is a block diagram of another conventional noise canceler for a video signal.

FIG. 3 shows another conventional noise canceler for a video signal which cancels noise using a correlation of the horizontal lines of a video signal.

Referring to FIG. 3, a video signal is input to first and second subtracters 12 and 13 via input port 11. The output signal of first subtracter 12 is delayed by delay line 14 by 1 H and is input to second subtracter 13. Here, H denotes a horizontal scan period. Second subtracter 13 subtracts the delayed signal input frown delay line 14 from the video signal input from input port 11 so as to extract and output the noise components and a correlation component to limiter 15. Limiter 15 extracts the noise components and sends them to first subtracter 12. First subtracter 12 subtracts the noise components from the video signal, and feeds back the subtracted video signal to delay line 14 so that the video signal is averaged to cancel the noise and is output to output port 16.

However, in the circuit shown in FIG. 3, if there is no correlation between horizontal lines, other signal components (besides the noise components) of the video signal are canceled. This deteriorates the resolution of a reproduced picture.

U.S. Pat. No. 4.885,639 (Dec. 5, 1989, by Sony Corporation of Japan, entitled "Apparatus for Eliminating a Noise Signal") has been presented to overcome the drawbacks of the conventional noise cancelers of FIGS. 1 and 3. In the above patent, an A/D converter, a limiter having multiple threshold values with respect to a digital signal and a switching circuit for selecting the outputs are installed at the output port of the conventional circuit shown in FIG. 1 to cancel noises at the edges. Further, a window detector and a correlation detector are provided at the output port of the HPF of the conventional circuit, so as to solve the disadvantages which exist when there is no correlation between lines. However, the circuit in the above patent is very complicated.

SUMMARY OF THE INVENTION

Therefore, it is an object of the present invention to provide a noise canceler for a video signal which is relatively simple yet is efficient in canceling cancel noise contained in the video signal, using the correlation between horizontal lines.

Further, it is another object of the present invention to provide a noise canceler for a video signal which, even when the correlation between the lines is weak, can prevent the distortion of signal components so as to acquire a faithfully reproduced video signal.

To accomplish the above object, the present invention provides a noise canceler comprising a video signal delay circuit for outputting, from consecutively input video signals, a succeeding line video signal, a present line video signal which is delayed by one horizontal line, and a preceding line video signal which is delayed by two horizontal lines; a minimum value detector for a horizontal line which compares the succeeding line video signal with the present line video signal, and the present line video signal with the preceding line video signal, so as to output lower-level first and second minimum values, respectively; a maximum value selector for comparing the first and second minimum values so as to select the higher of the two; a maximum value detector for a horizontal line which compares the succeeding line video signal with the present line video signal, and the present line video signal with the preceding line video signal, so as to output higher-level first and second maximum values, respectively; a minimum value selector for comparing the first and second maximum values so as to select the lower of the two; an adder for summing the maximum value output from the maximum value selector and the minimum value output from the minimum value selector so as to output a summed signal containing the correlation noise of a horizontal line of a video signal; and a subtracter for subtracting the present line video signal from the summed signal output from the adder so as to output a video signal without noise.

To accomplish the other object, the present invention provides a noise canceler comprising a video signal delay circuit for outputting, from consecutively input video signals, a succeeding line video signal, a present line video signal which is delayed by one horizontal line, and a preceding line video signal which is delayed by two horizontal lines; a minimum value detector for a horizontal line which compares the succeeding line video signal with the present line video signal, and the present line video signal with the preceding line video signal, so as to output lower-level first and second minimum values, respectively; a maximum value selector for comparing the first and second minimum values so as to select the higher of the two; a maximum value detector for a horizontal line which compares the succeeding line video signal with the present line video signal, and the present line video signal with the preceding line video signal, so as to output higher-level first and second maximum values, respectively; a minimum value selector for comparing the first and second maximum values so as to select the lower of the two; an adder for summing the maximum value output from the maximum value selector and the minimum value output from the minimum value selector so as to output a summed signal containing the correlation noise of the horizontal line of a video signal; a subtracter for subtracting the present line video signal from the summed signal output from the adder so as to output a video signal without noise; a correlation detector for comparing the succeeding line video signal, present line video signal and preceding line video signal so as to detect the correlation between horizontal lines and output a selection signal; and an output selector for receiving the output signal of the subtracter and the present line video signal so that, according to the selection signal of the correlation detector, if no correlation exists, the output of the subtracter is selected, and if correlation does exist, the present line video signal is selected.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

Figure 4:
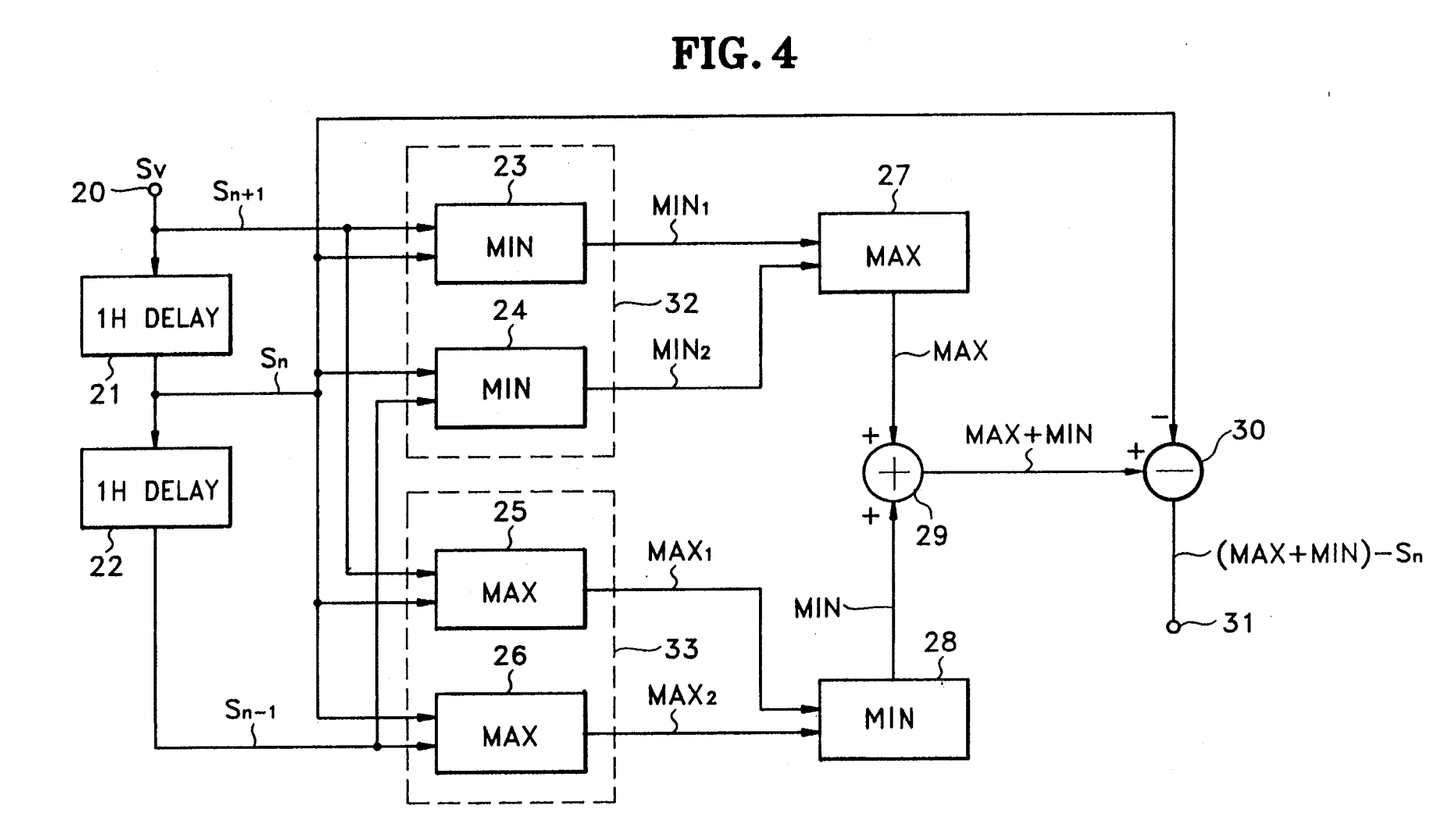
FIG. 4 is a block diagram of a noise canceler for a video signal according to the present invention.

Referring to FIG. 4, input video signals are delayed by one horizontal (H) period so that the output signal of a first delay line 21 at a reference time point $t_0$ is taken as a present line video signal $S_n$. A signal input to an input port 20 at the reference time point $t_0$ is taken as a succeeding line video signal $S_{n+1}$. The output of a second delay line 22 at the reference time point $t_0$ is taken as a preceding line video signal $S_{n-1}$. These signals are mathematically combined to cancel the noise components of the video signal, using the correlation between horizontal lines.

Specifically, video signal $S_v$ is input to first delay line 21, first minimum value detector (MIN) 23 and first maximum value detector (MAX) 25, via input port 20. The input video signal $S_v$ is delayed by first delay line 21 by one H period so as to be output simultaneously to second delay line 22, first minimum value detector 23, second minimum value detector 24, first maximum detector 25 and a second maximum detector 26. Second delay line 22 is serially connected to first delay line 21, to delay again the delayed signal by one H period, to then be output to second minimum value detector 24 and second maximum value detector 26. Therefore, the continuously input video signals $S_v$ are one-H-delayed by first delay line 21 to become a present line video signal $S_n$ Taking this as the reference. video signal $S_v$ input after a one H period delay, becomes a succeeding line video signal $S_{n+1}$. The output of second delay line 22 is input before the one H period delay to become a preceding line video signal $S_{n-1}$ which is input to minimum value detector 32 and maximum value detector 33. Here, minimum value detector 32 is composed of first minimum value detector 23 and second minimum value detector 24. Maximum value detector 33 consists of first maximum value detector 25 and second maximum detector 26.

First minimum value detector 23 compares the succeeding line video signal $S_{n+1}$ with the present line video signal $S_n$ so as to output a first minimum value $MIN_1$. Second minimum value detector 24 compares the present line video signal $S_n$ with the preceding line video signal $S_{n-1}$ so as to output a second minimum value $MIN_2$.

First maximum value detector 25 compares the succeeding line video signal $S_{n+1}$ with the present line video signal $S_n$ so as to output a first maximum value $MAX_1$. Second maximum value detector 26 compares the present line video signal $S_n$ with the preceding line video signal $S_{n-1}$ so as to output a second maximum value $MAX_2$.

Maximum value selector 27 compares the output of first minimum value detector 23 and the output of second minimum detector 24 so as to output a maximum value MAX.

Minimum value selector 28 compares the output of first maximum value detector 25 and the output of second maximum detector 26 so as to output a minimum value MIN.

Adder 29 sums the output of maximum value selector 27 and the output of minimum value selector 28 so as to output a signal representing the resulting total MAX+MIN.

Subtracter 30 subtracts present line video signal $S_n$ from the summed signal (i.e., the output of adder 29) so as to output the video signal without noise to output port 31.

Referring to FIGS. 5A-5K which illustrate signal waveforms at respective blocks of the noise canceler of FIG. 4, it can be noted that, when the video signals of adjacent lines are summed, since the level of correlated signal components is doubled without increasing the noise component level (due to the noise occurring randomly, i.e., without correlation), the averaging of the video signals cancels the noise. N1 through N5 indicated in FIGS. 5A–5K briefly represent noise components randomly contained in video signals.

Figure 5A:
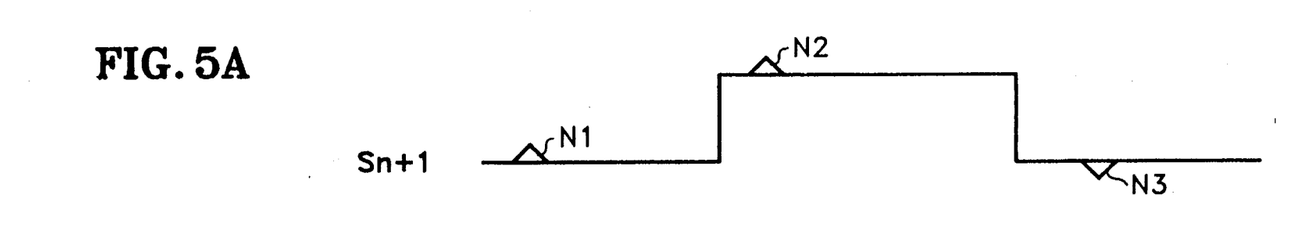
FIGS. 5A-5K illustrate signal waveforms at respective portions of the noise canceler of FIG. 4.
Figure 5B:
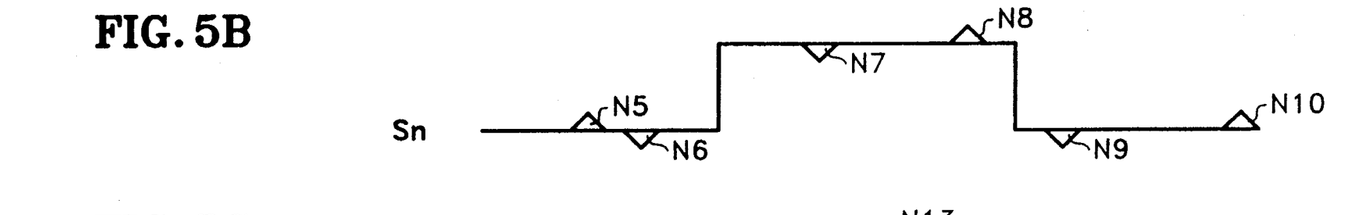
Figure 5C:
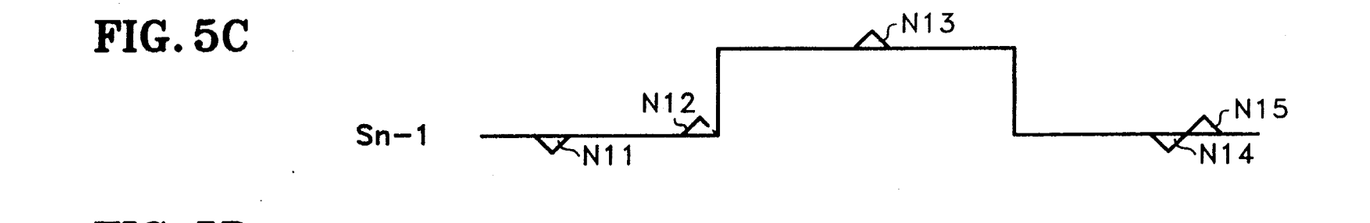

FIG. 5A shows the waveform of the succeeding line video signal $S_{n+1}$ which contains noise components represented as N1, N2 and N3. FIG. 5B shows the waveform of the present line video signal $S_n$ which contains noise components N5, N6, N7, N8, N9 and N10. FIG. 5C shows the waveform of the preceding line video signal $S_{n-1}$ containing noise components N11, N12, N13, N14 and N15.

Figure 5D:
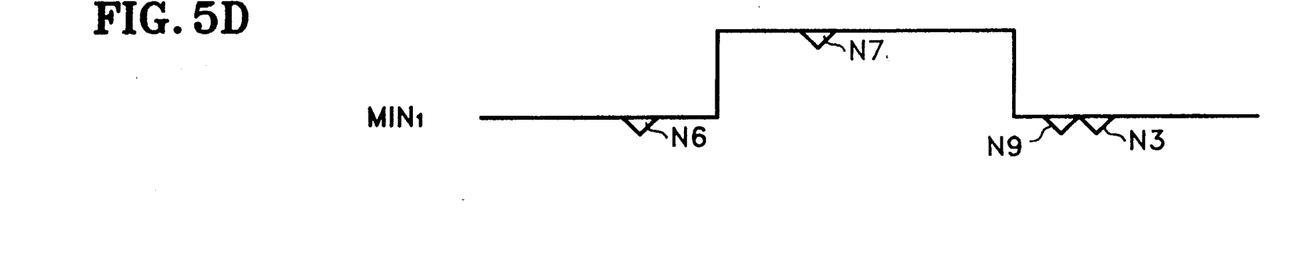
Figure 5E:
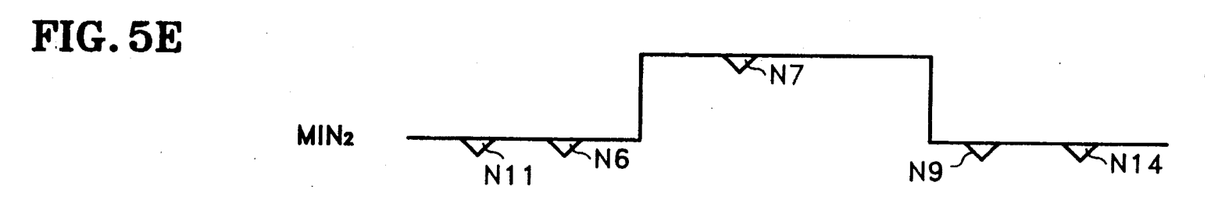

FIG. 5D is a waveform diagram in which the succeeding line video signal $S_{n+1}$ (FIG. 5A) and the present line video signal $S_n$ (FIG. 5B) are compared so as to obtain first minimum value $MIN_1$. FIG. 5E is a waveform diagram in which the present line video signal $S_n$ of FIG. 5B and the preceding line video signal $S_{n-1}$ of FIG. 5C are compared so as to obtain second minimum value $MIN_2$.

Figure 5F:
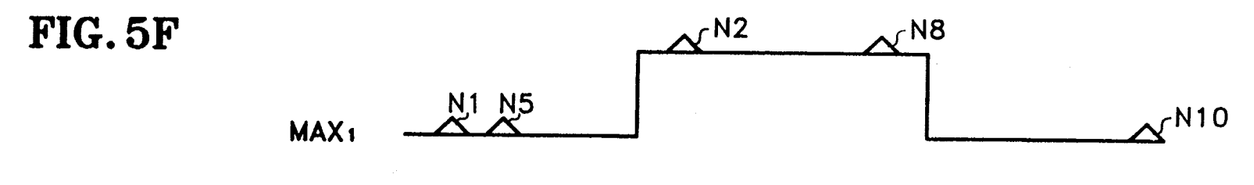
Figure 5G:
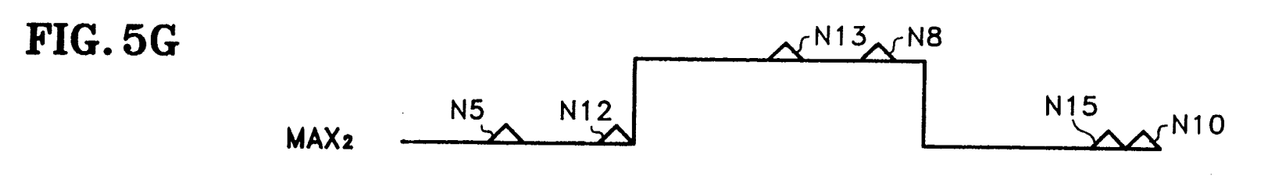

FIG. 5F is a waveform diagram in which the succeeding line video signal $S_{n+1}$ of FIG. 5A and the present line video signal $S_n$ of FIG. 5B are compared so as to obtain first maximum value $MAX_1$. FIG. 5G is a waveform diagram in which the present line video signal $S_n$ of FIG. 5B and the preceding line video signal $S_{n-1}$ of FIG. 5C are compared so as to obtain second maximum value $MAX_2$.

Figure 5H:
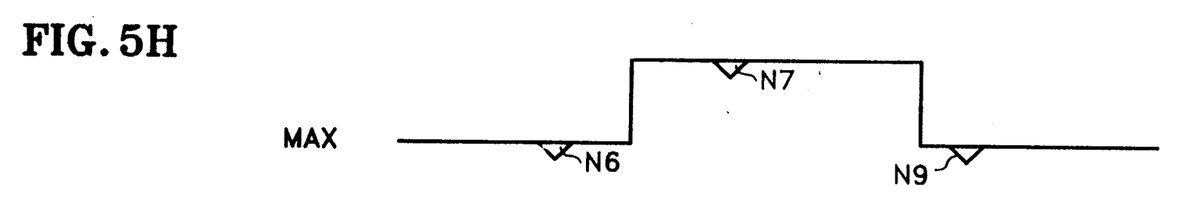
Figure 5I:
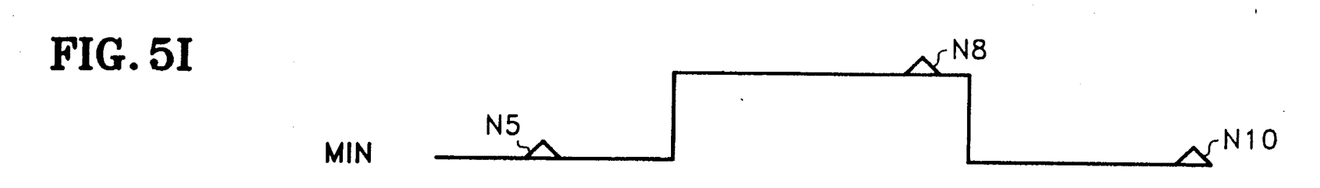

FIG. 5H is a waveform diagram in which the first minimum value $MIN_1$ of FIG. 5D and the second minimum value $MIN_2$ of FIG. 5E are compared so as to obtain maximum value MAX. FIG. 5I is a waveform diagram in which the first maximum value $MAX_1$ of FIG. 5F and the second maximum value $MAX_2$ of FIG. 5G are compared so as to obtain minimum value MIN.

Figure 5J:
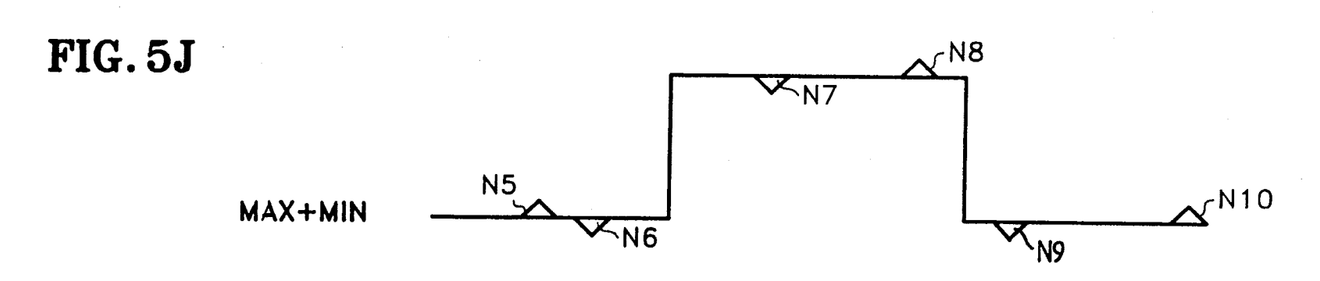

FIG. 5J is a waveform diagram of a summed signal MAX+MIN in which the maximum value of the minimum values of FIG. 5H and the minimum value of the maximum values of FIG. 5I are summed.

Figure 5K:
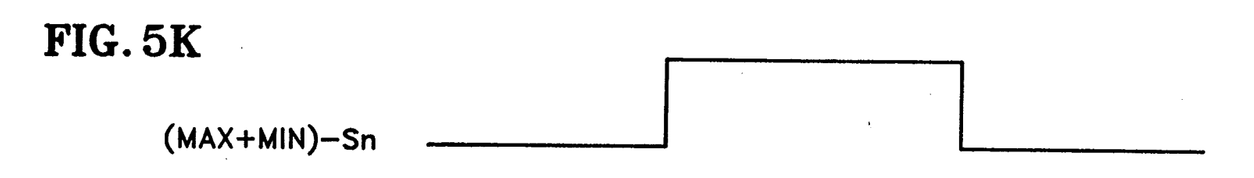

FIG. 5K shows a difference signal $(MAX+MIN)-S_n$ in which the present line video signal $S_n$ of FIG. 5B is subtracted from the summed signal of FIG. 5J. The difference signal is the video signal output without noise.

Now the operation of the noise canceler shown in FIG. 4 according to the present invention will be described below with reference to the operation waveform diagrams of FIGS. 5A–5K.

First minimum value detector 23 compares the succeeding line video signal $S_{n+1}$ of FIG. 5A and the present line video signal $S_n$ of FIG. 5B and thus detects first minimum value $MIN_1$ containing the N6, N7, N9 and N3 noise components which are minimum levels of the two line signals shown in FIG. 5D, so as to output the first minimum value to maximum value selector 27.

Second minimum value detector 24 compares the present line video signal $S_n$ of FIG. 5B and the preceding line video signal $S_{n-1}$ of FIG. 5C and thus detects second minimum value $MIN_2$ containing the N11, N6, N7, N9 and N14 noise components which are minimum levels of the two line signals shown in FIG. 5E, so as to output the second minimum value to maximum value selector 27.

Maximum m value selector 27 receives and compares minimum values from first and second minimum value detectors 23 and 24, selecting only the higher-level maximum value, as shown in FIG. 5H, to output the selected value to adder 29. For instance, when the waveform of FIG. 5D (the output of first minimum value detector 23) and the waveform of FIG. 5E (the output of second minimum value detector 24) are compared, since the video signal level as shown in FIG. 5D is higher than the level of noise component N11 as shown in FIG. 5E, the output of first minimum value detector 23 is selected to be output. Also, noise component N6 being the same level in both FIGS. 5D and 5E means that this noise component is output without change. Therefore, maximum value selector 27 compares first minimum value $MIN_1$ and second minimum value $MIN_2$, and if they differ, selects the greater, so that the N11, N3 and N14 noise components which are present in only one side of inputs are canceled and the N6, N7 and N9 noise components (called "correlation" noise) which are present in both sides of inputs as shown in FIG. 5G are output to adder 29 along with the signal component.

Meanwhile, first maximum value detector 25 compares the succeeding line video signal $S_{n+1}$ of FIG. 5A and the present line video signal $S_n$ of FIG. 5B and thus detects first maximum value $MAX_2$ containing the N1, N5, N2, N8 and N10 noise components which are maximum levels of the two line signals as shown in FIG. 5F, so as to output the first maximum value to minimum value selector 28.

Second maximum value detector 26 compares the present line video signal $S_n$ of FIG. 5B and the preceding line video signal $S_{n-1}$ of FIG. 5C and thus detects second maximum value $MAX_2$ containing the N5, N12, N13, N8, N15 and N10 noise components which are maximum levels of the two line signals as shown in FIG. 5G, so as to output the second maximum value to minimum value selector 28.

Minimum value selector 28 receives first and second maximum values $MAX_1$ and $MAX_2$ to compare the received minimum values, and selects only the lower-level minimum value, as shown in FIG. 5I, to output the selected value to adder 29. For instance, when the level of FIG. 5F (the output of first maximum value detector 25) and the level of FIG. 5G (the output of second maximum value detector 26) are compared, since the video signal level of FIG. 5G is lower than the level of noise component N1 of FIG. 5F, the output of second maximum value detector 26 is selected to be output, and since the level of noise component N5 contained in the waveform of FIG. 5F is the same as the level of noise component N5 contained in the waveform of FIG. 5G, noise component N5 is output without change. Therefore, minimum value selector 28 compares first maximum value $MAX_1$ and second maximum value $MAX_2$, and if they differ, selects the smaller one, so that the N1, N12, N2, N13 and N15 noise components which are present in only one side of inputs are canceled and the N5, N8 and N10 noise components (correlation noise) which are present in both sides of inputs as shown in FIG. 5I are output to adder 29 along with the signal component.

Adder 29 sums the output of maximum value selector 27 and the output of minimum value selector 28, and applies the summed signal as shown in FIG. 5J to subtracter 30. Here, as mentioned above, while the level of the summed signal from adder 29 is doubled, the levels of the noise components do not increase because the noise occurs randomly.

Subtracter 30 subtracts the present line video signal $S_n$ (FIG. 5B) from the summed signal (FIG. 5J), and outputs a difference signal without noise components as shown in FIG. 5K, as the video signal.

Figure 6:
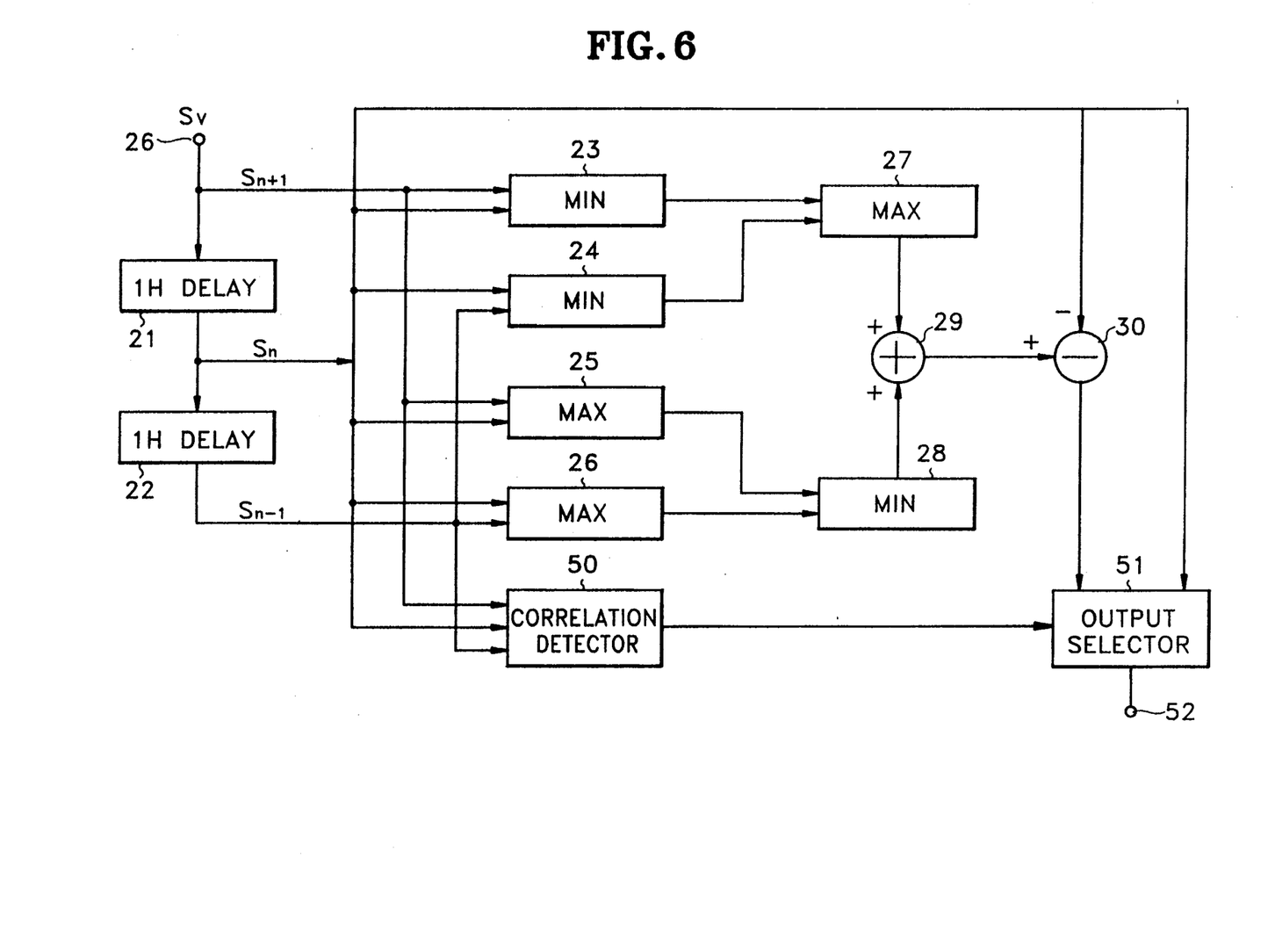
FIG. 6 is a block diagram of another embodiment of the noise canceler for a video signal according to the present invention.

FIG. 6 is another embodiment of the present invention, which additionally employs a correlation detector and output selector to the circuit of FIG. 4, so as to prevent the distortion of signal components which may be created due to the lack of correlation.

In FIG. 6, first delay line 21, second delay line 22, first minimum value detector 23, second minimum value detector 24, first maximum value detector 5, second maximum value detector 26, maximum value selector 27, minimum value selector 28, adder 29 and subtracter 30 are the same as in FIGS. 4 and 5A–5K.

The correlation detector 50, which is newly included in FIG. 6, compares the succeeding line video signal $S_{n+1}$ present line video signal $S_n$ and preceding line video signal $S_{n-1}$ so as to determine the correlation among them. If the present line video signal $S_n$ has correlation with the other two line video signals, correlation detector 50 controls output selector 51 to select the output signal of subtracter 30 (processed as described above). If the present line video signal has no correlation with the other two video signals, correlation detector 50 controls output selector 51 to select the present line video signal $S_n$.

Output selector 51 selects one of the output of subtracter 30 and the present line video signal $S_n$ according to the selected signal of correlation detector 50, and outputs the selected one to output port 52.

Figure 7:
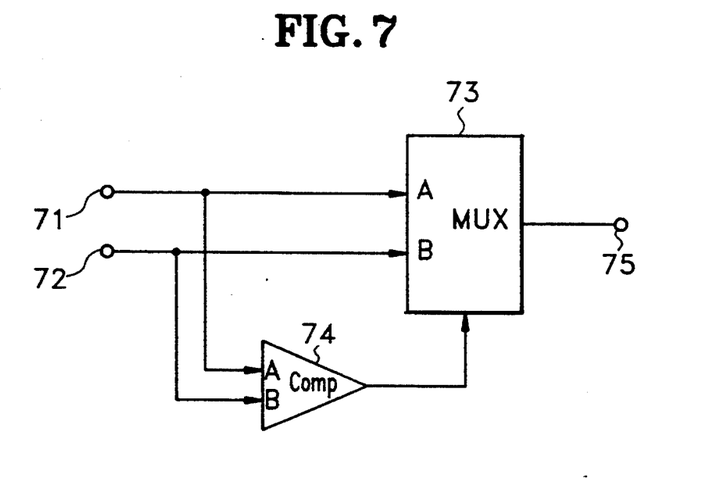
FIG. 7 is a circuit diagram of one example of the minimum value detector or maximum value detector shown in FIGS. 4 and 6.

FIG. 7 shows one embodiment of first and second minimum value detector 23 and 24, first and second maximum value detector 25 and 26, maximum value selector 27 and minimum value selector 28 which are shown in FIGS. 4 and 6. They can be implemented with a multiplexer and comparator.

In FIG. 7, if the circuit is used as the first minimum value detector 23, the signals to be compared, that is, succeeding line video signal $S_{n+1}$ and present line video signal S, are input to input ports A and B of multiplexer 73 and comparator 74 via input ports 71 and 72, respectively. Comparator 74 compares the inputs of input ports A and B and outputs the result to the selection port of multiplexer 73 so as to select one of these inputs to be output to output port 75. The following Table 1 illustrates the output of comparator 74 and multiplexer 73 according to the signals to be compared.

TABLE 1

| state | comparator output | MUX output MAX | MIN |
|---|---|---|---|
| A ≧ B | H | A | B |
| A < B | L | B | A |

In Table 1, if the circuit of FIG. 7 is used as the first maximum value detector 25 and the signal of input port A is greater than or equal to the signal of input port B, comparator 74 outputs a "high" signal to the selection port of multiplexer 73 so that multiplexer 73 selects and outputs the input signal of input port A. If the circuit is used as the first minimum value detector 23, multiplexer 73 outputs the input signal of input port B. If the signal of input port A is smaller than the signal of input port B, the comparator and multiplexer function in an opposite manner.

Figure 8:
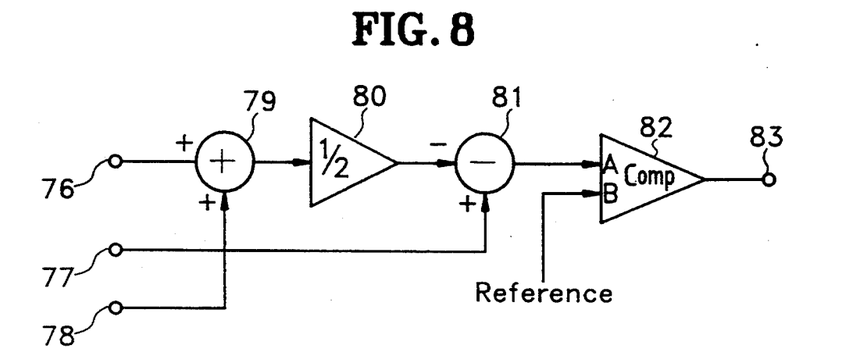
FIG. 8 is a circuit diagram of one example of the correlation detector shown in FIG. 6.

As indicated above, FIG. 8 is an example of the correlation detector 50 of FIG. 6. In FIG. 8, the succeeding line video signal $S_{n+1}$ and preceding line video signal $S_{n-1}$ are summed in adder 79, thus doubling the level and supplying the summed signal to an attenuator 80. Attenuator 80 reduces the input level by hall and outputs the attenuated signal to subtracter 81. Subtracter 81 subtracts the output of attenuator 80 from the present line video signal $S_n$ and outputs the difference signal to input port A of comparator 82. Comparator 82 compares the reference signal input to input port B and the output of subtracter 81 so as to detect the correlation of the three line signals. If the three line signals have a strong correlation, the output signal of subtracter 81 is smaller than the reference value, so that comparator 82 outputs a "low" signal. If they have no correlation, the output of subtracter 81 is greater than the reference value so that comparator 82 outputs a "high" signal.

Figure 9:
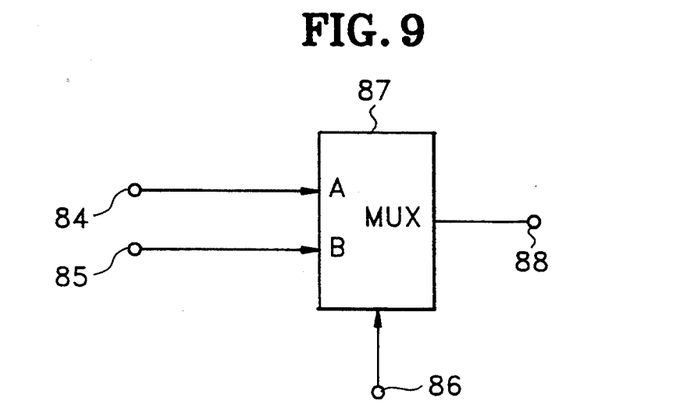
FIG. 9 is a circuit diagram of one example of the output selector shown in FIG. 6.

As indicated above, the circuit of FIG. 9 represents an example of the output selector 51 of FIG. 6. Referring to FIG. 9, the present line video signal $S_n$ is input to input port A of multiplexer 87 via input port 84 and the output of subtracter 30 is input to input port B of multiplexer 87 via input port 85, so that one is selected by signal via port 86 and output via port 88 according to the output of comparator 82 of FIG. 8. In other words, if there is strong correlation between signals and the output of comparator 82 is low, the output signal of subtracter 30 at input port B is selected to be output. If there is no correlation and the output of comparator 82 of FIG. 8 is high, the present line video signal $S_n$ at input port A is selected to be output.

Figure 10A:
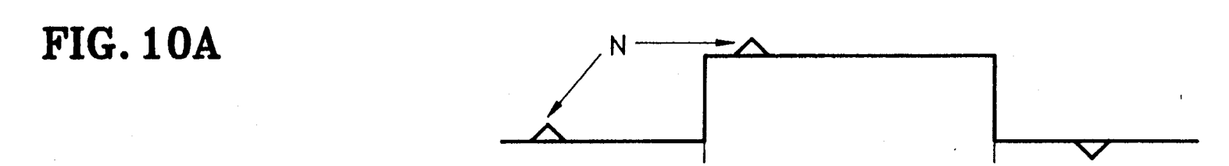
FIGS. 10A-10E are operation waveforms of the conventional noise canceler and the noise canceler of FIG. 6.

FIGS. 10A. 10B and 10C illustrate waveforms of video signals $S_{n+1}$, $S_n$ and $S_{n-1}$ which contain noise. Especially, FIG. 10B is the waveform of the present line video signal $S_n$ which is delayed by $\Delta t$ to create portions r1 and r2 which have no correlation.

Figure 10B:
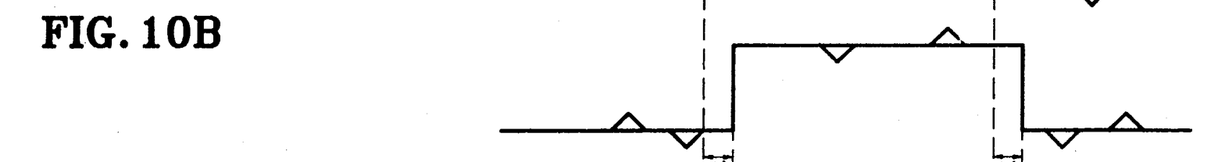
Figure 10C:
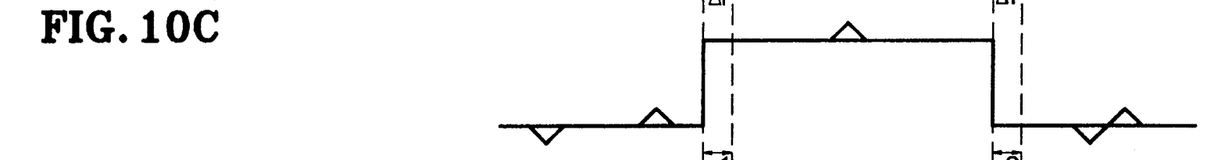
Figure 10D:
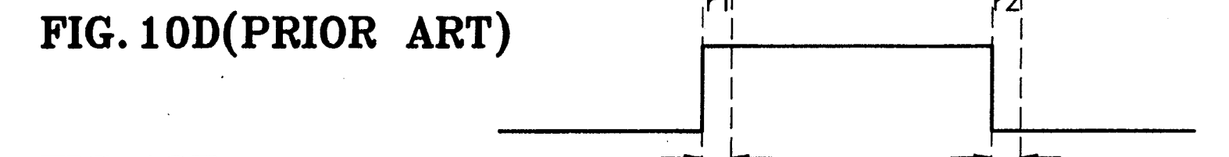

FIG. 10D shows a waveform in which noise is canceled from the waveforms of FIGS. 10A, 10B and 10C, using a conventional noise canceler. It can be seen from the waveform of FIG. 10D that the distortion of the present line output signal is created in the leading edge r1 and falling edge r2 which are portions without correlation.

Figure 10E:
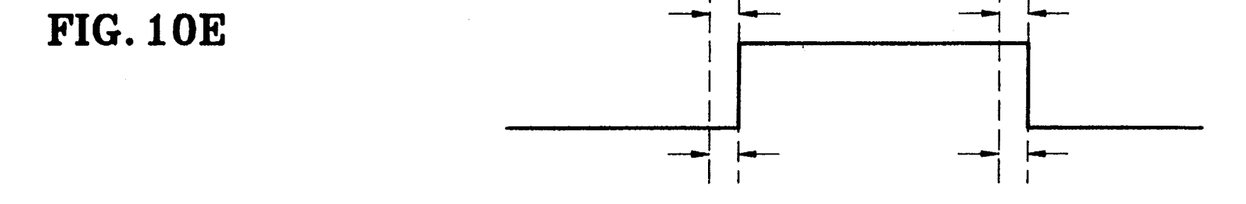

FIG. 10E shows a waveform in which noise is canceled from the waveforms of FIG. 10A, 10B and 10C, using the circuit of FIG. 6. The correlation detector 50 of FIG. 6 selects the present line video signal $S_n$ of FIG. 10B in the non-correlating portions r1 and r2 so as to cancel noise, without any distortion of the present line output signal.

As described above, the present invention efficiently extracts and cancels only the noise contained in a video signal, using the correlation of video signals, so as to prevent the deterioration of resolution during reproduction. Further, the present invention is easy to implement because of the simplified circuitry.

What is claimed is:

1. A noise canceler for a video signal comprising:
   a video signal delay circuit for outputting, from consecutively input video signals, a succeeding line video signal, a present line video signal which is delayed by one horizontal line relative to the succeeding line video signal, and a preceding line video signal which is delayed by two horizontal lines relative to the succeeding line video signal;
   a minimum value detector for a horizontal line which compares the succeeding line video signal with the present line video signal to output a lower-level first minimum value, and which compares the present line video signal with the preceding line video signal, so as to output a lower-level second minimum value;

a maximum value selector for comparing said first and second minimum values so as to select and output a higher of the first and second minimum values;

a maximum value detector for a horizontal line which compares the succeeding line video signal with the present line video signal to output a higher-level first maximum value, and which compares the present line video signal with the preceding line video signal, so as to output a higher-level second maximum value;

a minimum value selector for comparing said first and second maximum values so as to select the lower of the first and second maximum values;

an adder for summing the maximum value output from the maximum value selector and the minimum value output from the minimum value selector so as to output a summed signal containing correlation noise of the horizontal line of a video signal;

a subtracter for subtracting the present line video signal from the summed signal output from the adder so as to output a video signal without noise;

a correlation detector for comparing the succeeding line video signal, present line video signal and preceding line video signal so as to detect a correlation between horizontal lines and output a selection signal; and an output selector for receiving the output signal of the subtracter and the present line video signal and for selecting one of the output signal and the present line video signal, according to the selection signal of the correlation detector, said output selector selecting, if correlation does exist, the output of the subtracter, and if no correlation exist, selecting the present line video signal.

2. A noise canceler for a video signal as claimed in claim 1, wherein the correlation detector comprises:

an adder for summing the succeeding line video signal and preceding line video signal;

an attenuator for receiving an output of the adder so as to reduce a level thereof by one-half;

a signal subtracter for subtracting an output of the attenuator from the present line video signal; and a comparator for comparing an output of the signal subtracter with a reference level to output the selection signal.

3. A noise canceler for a video signal as claimed in claim 1, wherein the output selector comprises a multiplexer.

* * * * *